United States Patent
Cognet

(10) Patent No.: US 6,801,505 B1
(45) Date of Patent: Oct. 5, 2004

(54) METHOD OF USING COMPUTER EQUIPMENT TO SEND A TIME-STAMPED FRAME

(75) Inventor: Yves Cognet, Versailles (FR)

(73) Assignee: QoSmetrics, Inc., Simi Valley, CA (US)

(*) Notice: Subject to any disclaimer, the term of this patent is extended or adjusted under 35 U.S.C. 154(b) by 848 days.

(21) Appl. No.: 09/727,377

(22) Filed: Nov. 28, 2000

(51) Int. Cl.$^7$ ................................................ H04L 1/00
(52) U.S. Cl. ........................ 370/252; 370/352; 370/509; 370/516
(58) Field of Search ............................... 370/252, 352, 370/356, 389, 400, 401, 503, 507, 508, 509, 516, 517, 518, 519; 375/354, 356, 359; 709/228, 230, 231

(56) References Cited

U.S. PATENT DOCUMENTS

| 5,394,395 A | 2/1995 | Nagai et al. |
| 5,859,835 A | 1/1999 | Varma et al. |
| 6,259,677 B1 * | 7/2001 | Jain ........................... 370/252 |
| 6,360,271 B1 * | 3/2002 | Schuster et al. ............ 709/231 |

FOREIGN PATENT DOCUMENTS

| BR | 000684502 | 8/1995 |

OTHER PUBLICATIONS

DeLeon et al, An Adaptive Predictor For Media Playout Buffering, IEEE, pp. 3097–3100, 1999.*
Montgomery, Techniques for Packet Voice Synchronization, IEEE, pp. 1022–1028, 1983.*
Ramjee et al, Adaptice Playout Mechanisms for Packetized Audio Applications in Wide–Area Networks, IEEE, pp. 680–688.*
Kostas et al, Real–Time Voice Over Packet–Switched Networks, IEEE, pp. 18–27, 1998.*
Moon et al, Packet audio playout delay adjustment performance bounds and algorithms, Multimedia Systems, pp. 17–28, 1998.*

* cited by examiner

Primary Examiner—Frank Duong
(74) Attorney, Agent, or Firm—Kelly Lowry & Kelley, LLP

(57) ABSTRACT

The invention relates to a method of using computer equipment to send a time-stamped frame. The method implements:

generating at a given instant $T_S$ a frame whose time stamp $T_O$ is equal to $T_S+\delta$, where $\delta$ is a time interval required by the computer equipment between generating a time-stamped frame and sending the last bit thereof;

sending said time-stamped frame as generated at the instant $T_S$ when an absolute time clock of the computer equipment reaches a value equal to $T_S+\delta-\sigma$ where $\sigma$ is the duration required for sending the bits of said frame, such that the last bit of the frame is sent at instant $T_S+\delta$.

8 Claims, 2 Drawing Sheets ated with lack of accuracy concerning absolute time value generated by the system clock of the computer for time stamping frames. As is well known, system clocks are subject to phenomena of drift and of jitter which give rise to uncertainty about the absolute time value which at best is of the order of about 10 milliseconds.

METHOD OF USING COMPUTER EQUIPMENT TO SEND A TIME-STAMPED FRAME

BACKGROUND OF THE INVENTION

It is known to make use of special time-stamped frames for measuring the time required for transfer between a piece of computer equipment and a remote piece of equipment to which it is connected, e.g. by a communications network, and in particular the Internet.

In known techniques, the time stamp of such a frame corresponds to the instant at which it was generated.

Frames generated under such conditions do not enable transmission time to be measured accurately, and in any event transmission time is defined in standards as the time between the last bit of the frame being sent and the first bit of the frame being received by the remote equipment.

Reference can be made to the following provisional documents of the Network Working Group:

A one-way delay metric for IPPM, by G. Alnes et al. (Request for Comments, September 1999); and Instantaneous packet delay variation metric for IPPM, by Demichelis and Chimento (Internet draft, December 1999).

In the present state of network performance, e.g. Internet performance, this lack of accuracy is without consequence since the transmission time being measured can be as long as several hundreds of milliseconds, or even several seconds.

Nevertheless, there is a very clear trend at present towards higher data rate networks and towards the creation of services in which transmission time is guaranteed, and this makes it necessary to have a higher-performance measurement tool for quality control of high-quality services.

It should also be observed that the above-mentioned lack of accuracy is associated with lack of accuracy concerning the absolute time value generated by the system clock of the computer for time stamping frames. As is well known, system clocks are subject to phenomena of drift and of jitter which give rise to uncertainty about the absolute time value which at best is of the order of about 10 milliseconds.

OBJECTS AND SUMMARY OF THE INVENTION

The invention makes it possible to avoid at least one of the above-mentioned drawbacks by a method of using computer equipment to send a time-stamped frame, the method performing the steps of:

generating at a given instant $T_S$ a frame whose time stamp $T_O$ is equal to $T_S+\delta$, where $\delta$ is a time interval required by the computer equipment between generating a time-stamped frame and sending the last bit thereof;

sending said time-stamped frame as generated at the instant $T_S$ when an absolute time clock of the computer equipment reaches a value equal to $T_S+\delta-\sigma$ where $\sigma$ is the duration required for sending the bits of said frame, such that the last bit of the frame is sent at instant $T_S+\delta$.

It is advantageous for said absolute time clock to be clocked at a frequency equal to a frequency at which frame bits are sent by the computer equipment, or indeed to a multiple or a submultiple thereof.

Preferably, the given instant $T_S$ is generated by a reference counter based on an oscillator which is updated by a time reference, the oscillator being, for example of the temperature-compensated crystal oscillator type.

Said time reference may be generated by a receiver for receiving a universal time reference, in particular a GPS receiver.

The absolute time clock may present a first counter constituted by said reference counter and a second counter clocked by a frame send clock whose frequency is equal to the frequency at which frame bits are sent by the computer equipment, or indeed a clock whose frequency is equal to a multiple or a submultiple of the frequency of the frame send clock, and which is reset to zero by said first counter.

Advantageously, the method stores said time-stamped frames in a first register and stores other frames that are not time-stamped in a second register, and sends a time-stamped frame on a priority basis from the first register at least whenever the computer equipment is not capable of sending an entire frame contained in the second register before instant $T_S+\sigma-\delta$ which corresponds to the instant at which the first bit of said time-stamped frame should be sent.

In a preferred implementation, the method performs the steps of:

a) analyzing the content of the first and second registers by first and second respective frame identification pointers;

b) if at least one frame is contained in the second register, calculating the time it will take to send and calculating an ideal sending time $T_E$ which is the sum of the absolute time and the time taken to send said frame;

c) if the ideal time $T_E$ is less than $T_S+\sigma-\delta$, triggering sending of said frame contained in the second register;

d) otherwise, causing the second pointer to wait;

e) where appropriate, repeating steps b) to d) until the second pointer is caused to wait;

f) if the second pointer is caused to wait or if the test performed in a) indicates that the second register does not contain a frame, sending said time-stamped frame contained in the first register; and g) sending any frames contained in the second register and returning to a).

BRIEF DESCRIPTION OF THE DRAWINGS

Other characteristics and advantages of the invention will appear more clearly on reading the following description, given by way of non-limiting example and made with reference to the accompanying drawings, in which.

MORE DETAILED DESCRIPTION

The invention thus proposes using a workstation or a piece of equipment, e.g. a computer A, to send time-stamped frames $TR_i$ to remote equipment, e.g. B, C, and/or D, etc. . . . , via a network, e.g. the Internet. A piece of equipment such as a server S can be used to retrieve the measured data from the stations A, B, C, D, etc. . . .

As mentioned above, known methods of time-stamping frames do not enable great accuracy to be obtained in determining the propagation time between a sending station and a remote piece of equipment. This is due firstly to the inaccuracy of the local clock used by the sending station, and secondly to the fact that the time stamp marked in the frame and as given by the local clock does not correspond exactly to the time at which the frame was sent, even in time as measured by that clock.

With a network like the conventional Internet, where data rates are low and/or transmission times are long, this uncertainty does not degrade measurements significantly.

However the situation is quite different when dealing with high data rate networks, e.g. an Internet or an Intranet, and more particularly services for which it is desired to guarantee quality. It is now necessary to have a measurement tool available that can measure accurately and repetitively the transmission times between the sending equipment and remote equipment receiving the service in question.

There also exists another method of measuring propagation time which consists in measuring the go-and-return propagation time assuming that propagation time is statistically equal in both directions. That method is not suitable for networks such as the Internet in which paths are not necessarily the same in both directions and in which the associated propagation times can be very different because of the existence of different access suppliers. As a result, that go-and-return method cannot be used to obtain high accuracy, and in any event the accuracy it provides is not directly quantifiable.

The idea on which the invention is based is to eliminate at least the difference between the time stamp of the frame and the instant at which it is sent by marking the frame with a future instant representing the instant at which the frame will indeed be sent.

Figure 2:
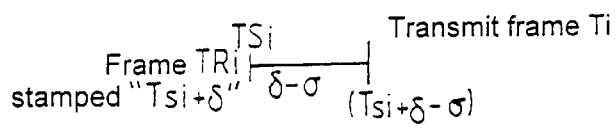
FIGS. 2 and 3 show the procedure for sending time-marked frames in accordance with the invention and in association with the architecture for which a preferred embodiment is shown in FIG. 4.

As shown in FIG. 2, a frame $TR_i$ is stamped at an instant $T_si$ with a time stamp whose value is equal to $T_si+\delta$. $\delta$ is not less than the time required for sending the complete frame starting from the time at which it is generated. The equipment A is configured so that the frame is sent at an instant $T_si+\delta-\sigma$ where $\sigma$ is the duration required for sending all of the bits in the frame.

Under these conditions, the first bit of the frame begins to be sent at instant $T_si+\delta-\sigma$, and the last bit is sent at instant $T_si+\delta$ which corresponds exactly to its time stamp.

The method of the invention is generally used in an installation which sends not only time-stamped frames, but also ordinary frames which are not time-stamped by the method of the invention.

Figure 3:
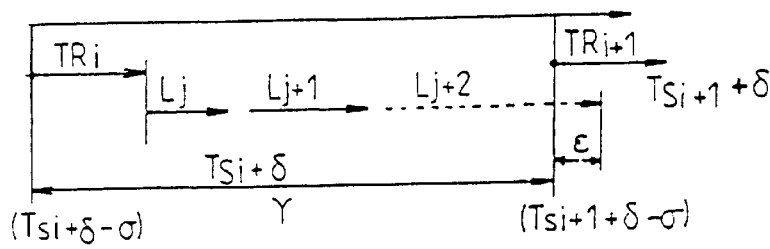

A sequencer enabling the invention to be implemented, and possibly also enabling frame priority to be managed, is described below with reference to FIGS. 3 and 4.

To measure propagation times, whether in one particular direction or in the context of a go-and-return path, the server S has a real time clock RTC driven by a temperature-controlled crystal oscillator Q (TCXO) so as to present sufficient accuracy in time with low drift. The accuracy of such a real time clock RTC is typically of the order of ±1 ppm, and its error is about ±1 min over one year for a temperature range of 0° C. to 40° C.

By way of example, an oscillator is used operating at 32,768 Hz whose frequency is multiplied by a phase coherent frequency multiplier FML. For this purpose, a counter is clocked by the network real time clock RTC and is continuously resynchronized with the local real time clock RTC.

Frames are sent by an interface INT which is clocked by a network clock HR. By way of example, the network can be an Ethernet network at 100 Mbps clocked by a 100 MHz clock with accuracy of ±50 ppm. The jitter of this clock is about 3 nanoseconds. If it is desired to keep this jitter below the duration of 1 bit at 1 GHz, it is necessary to divide the period of the oscillator RTC using the above-specified frequency multiplier FML.

The real time clock RTC of the computer of server A which sends the frames to the remote equipment B, C, D, etc. . . . can be synchronized with their real time clocks by means of a GPS receiver which resynchronizes the real time clock RTC periodically with universal time UTC. This synchronization makes it possible to keep drift to as small a value as possible, with the value of the drift depending on the periodicity of such synchronization.

The maximum accuracy that can be obtained between time UTC and the value shown by the time-stamped frame is of the order of ±1 bit of the network clock HR. Using a GPS receiver makes it possible to keep the difference between the value carried by the time stamp and universal time UTC down to a value that is typically of the order of 100 nanoseconds. To measure transit time, the maximum accuracy obtained is given by GPS (typically 100 ns). When measuring latency time (variation in transit time), accuracy is of the same order as the duration of 1 bit of the network clock HR (i.e. 10 ns for a 100 MHz clock in the above example).

Figure 4:
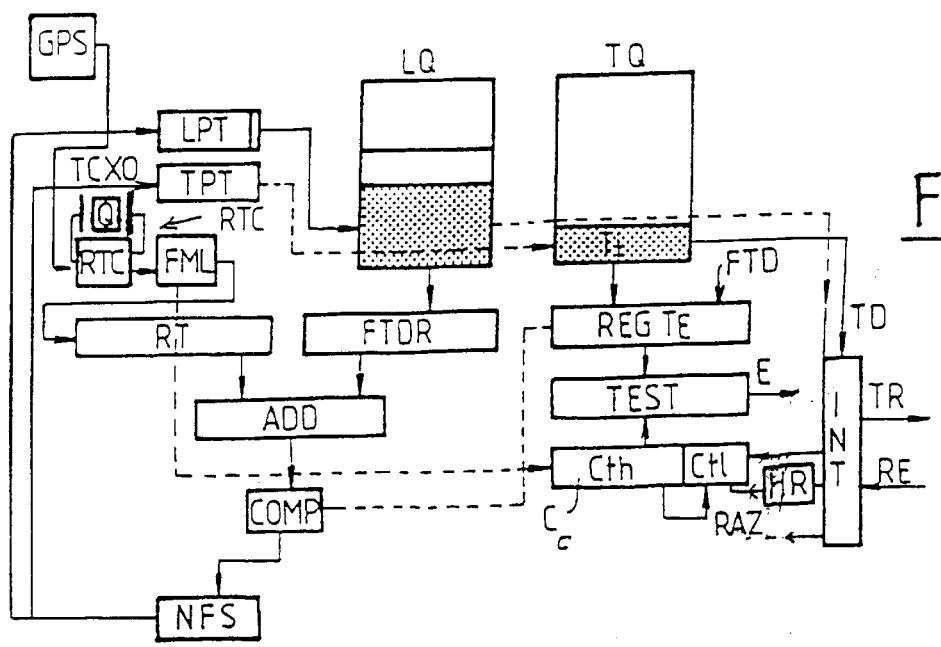

The apparatus comprises:
 a microprocessor CPU with associated random access memory RAM and programmable memory PROM, the PROM containing the FIG. 4 sequencer, and the CPU being associated with a real time clock RTC driven by the crystal Q and synchronized on universal time via a GPS receiver;
 the frequency multiplier FML which can optionally be used to improve the resolution of the real time clock RTC; and
 a network interface INT comprising a transmit section TR and a receive section RE and including a send and receive buffer and a network controller. To ensure that data is transferred quickly to and from the network, direct memory access (DMA) can be implemented for processing the data. For example, a conventional network controller can be for an Ethernet network with the associated logic and clock HR.

The apparatus which implements the invention can be separate apparatus or it can be incorporated in a computer with which it is coupled by a local bus such as a bus BCI.

On starting, the CPU initializes the network controller and the various registers such as those of the real time clock RTC. The real time clock RTC is initialized with the value read from the GPS receiver.

When an entity or a program instructs the CPU to send a time-stamped frame, the CPU reads the time $T_S$ from the clock RTC. It adds a delay $\delta$ to the value it reads, where the delay is sufficient to compensate for the time required by various entities such as time-stamping, frame copying, or DMA. Another delay $\sigma$ is calculated so as to take full account of the length of the frame, it being given that the time stamp, according to the standard, should represent the moment at which the last bit of the frame is sent by the interface INT.

The frame is stamped with the value $T_S+\delta$ in a known format specified by the standard, and it is transferred to the transmit buffer memory of the network controller.

The value $T_S+\delta-\sigma$ is calculated to determine the instant at which the frame should be sent. When all time-stamped frames are of the same length, the values $T_S+\sigma$ can be calculated on starting the program and can be fixed for an entire measurement campaign, except on LHDLC networks where bit insertions might occur.

The value of the delay $\sigma$ can vary from one network technology to another. For example, for an Ethernet network, in order to comply with the CSMA/CD standard, this delay must be greater than the maximum size for a frame, including its CRC and preamble. For an HDLC network and as mentioned above, the delay $\sigma$ can be calculated to take account of the procedure for inserting a 0 bit which takes place each time five consecutive "1 s" are detected in the frame.

When a frame is to be transmitted, the transmission section of the network controller detects whether there is a time stamp in the frame. This detection can be performed in various ways, e.g. using a marker in a special protocol. If there is no time stamp, then the frame is sent at once. If a time stamp is detected, then the transmission section of the network controller waits until the universal time value corresponding to the time stamp $T_S$ minus the quantity $\sigma$ is equal to the corresponding value given by the real time clock RTC. This universal time can be expressed, for example, in a format that is compatible with low cost logic circuits, such as binary counters. By way of example it can be the total number of nanoseconds that have elapsed since Jan. 1, 1970. When the two values become equal, the frame is sent immediately.

Figure 1:
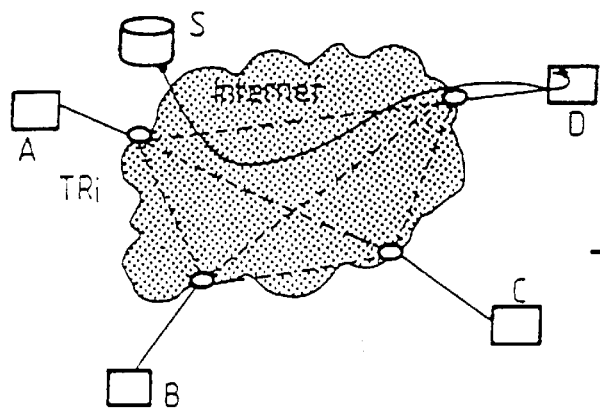
FIG. 1 shows how the invention can be implemented in the context of an Internet type network.

As shown in FIG. 1, the frame is time-stamped with a future value. The difference $\gamma$ between two time-stamped frames ($31_Si$, $31_Si+1$) must be greater than the time required for transmitting a frame (see FIG. 3). Given that the size of a frame can vary, the lower limit on $\gamma$ is the time taken to transmit the longest frame at the slowest on-line data rate corresponding to the network technology implemented. For example, for a 100 MHz Ethernet network, the minimum value of $\gamma$ is 1227.2 microseconds, unless the maximum authorized length for a frame is shortened.

If there exists a time-stamped frame waiting to be transmitted, and if the time remaining for sending it is less than the time that would be required to transmit some other non-time-stamped frame, then the transmission controller causes all non-time-stamped frames to wait. This must be performed in such a manner as to avoid delaying transmission of the time-stamped frame and it must be sent as a priority at the selected instant. This procedure ensures that all time-stamped frames are indeed sent at the exact selected instant. To this end, the transmission controller has two send buffers, a buffer LQ used for all conventional frames and a buffer TQ used for all time-stamped frames.

If the buffer TQ is empty, then the controller sends the frames that are waiting in the buffer LQ. If one or more frames are waiting in the buffer TQ, the controller checks whether it has enough time to send one or more waiting frames from the buffer LQ. For this purpose, it begins by counting the bits of the first frame waiting in the buffer LQ. If the number of bits in this frame corresponds to it occupying a length of time on sending that is less than the difference between $T_S+\delta-\sigma$ corresponding to the frame waiting in the buffer TQ and the instantaneous value given by the real time clock RTC, then enough time is available for sending this frame from the buffer LQ, so the controller sends the first frame from the buffer LQ. If this length of time is greater than the length of time remaining, then the buffer LQ is allowed to wait. This procedure is repeated for each other frame that might be waiting in the buffer LQ until all of them have been sent or until the buffer LQ has been caused to wait so as to allow a time-stamped frame present in the buffer TQ to be sent.

Each time the sequencer receives a request to transmit a frame, it detects whether or not the frame is time-stamped and puts it into the appropriate stack LQ or TQ. The transmission section decodes the time stamp $T_S+\delta$ carried by the frame and subtracts the send duration $\sigma$ therefrom. The resulting value $T_S+\delta-\sigma$ is equal to within 1 bit to the send time of the frame known as the "wire time", and it is stored in a register $RGET_t$.

Each time the sequencer is activated, the value of the real time clock RTC is loaded into a register $C_{th}$ which is updated on each cycle of the crystal Q. A second register $C_{r1}$ which is reset to zero each time the register $C_{th}$ is incremented by 1 is driven by the network clock HR, e.g. at 100 MHz for an Ethernet network. As a result, $C_{r1}$ is incremented once every 10 nanoseconds. This makes it possible to conserve the desired accuracy without having to lock the frequency or the phase of the network clock HR relative to the real time clock RTC, whose frequency is greater than that of the network clock HR but whose accuracy is of the order of ±1 bit of the network clock, which suffices to determine the value of $T_Si$ for a frame $TR_i$.

In parallel, the sequencer analyzes the contents of the buffers LQ and TQ. To this end, it maintains two internal pointers which identify the frames ready for transmission in each of the queues.

Each time a frame is detected in the queue LQ, the sequencer determines the time required for transmitting the frame. This value is stored in a register FTDR and it is added to the universal time value contained in the register RT. The resulting value is stored in a register ADD. Its content is compared with the content of the register $REGT_t$. If the content of the register ADD is less than the content of the register $REGT_t$, then the frame selector is updated to the value carried by the pointer for the queue LQ and the frame is sent. Otherwise, the pointer for the queue LQ is marked as waiting and the frame selector is updated by the value carried by the pointer and the frame waiting in the buffer TQ.

If the buffer TQ is not empty and if the queue pointer LQ is waiting, then there is a time-stamped frame that must be sent. It is sent when the comparator test detects coincidence between the content of the register REGTT and of the register $C_t$. Once a time-stamped frame has been sent, the selector for selecting the frame to be sent is reset to zero. The register $REGT_t$ is filled with "1 s". The sequencer can then send the frames waiting in the buffer LQ and the system returns to its starting point, i.e. it analyzes the content of the queues LQ and TQ.

Figure 5:
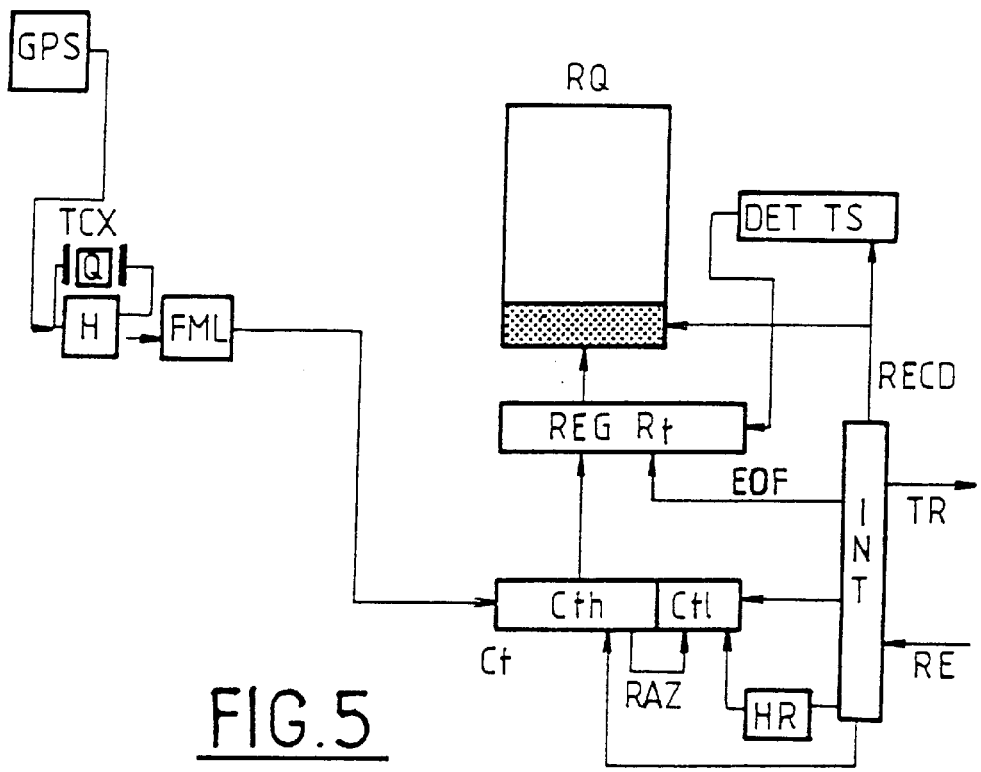
FIG. 5 shows a procedure for receiving frames time-stamped in accordance with the invention.

Frame reception is described with reference to FIG. 5. The RFC 2330 standard defines the time at which a packet or frame P is received, its "wire arrival time" as being the instant at which any bit of the frame or packet is received. When the interface INT while in receive mode RE detects the first bit of an incoming frame, the value of the counter $C_t$ is transferred into a register $REGR_t$. Once the frame has been received, the received section of the network controller analyzes the data content of the frame as it passes in order to detect whether or not there is a time stamp in the time-stamped field of the received frame. If there is no time stamp, then once the last bit has been received, the frame is transferred into the receive buffer RQ and the receive section informs the central unit that a frame is available.

When a time stamp is detected, the receive controller performs the following tasks:

it waits for the end of the frame signal as supplied by the network interface;

it reads the value in the register REGR_t and it calculates the universal time value which corresponds to the content of this register;

it adds this universal time value to the end of the frame and it directs it to the receive buffer RQ; and it informs the central unit that a frame has been received.

When two remote equipments implement the invention, the difference between the time stamp and the universal time value that has been added to the end of the frame gives an accurate measure of the propagation time of the frame which is defined in the standard as being the time between sending the last bit of the frame as sent and receiving the first bit of the frame as received.

Figure 6:
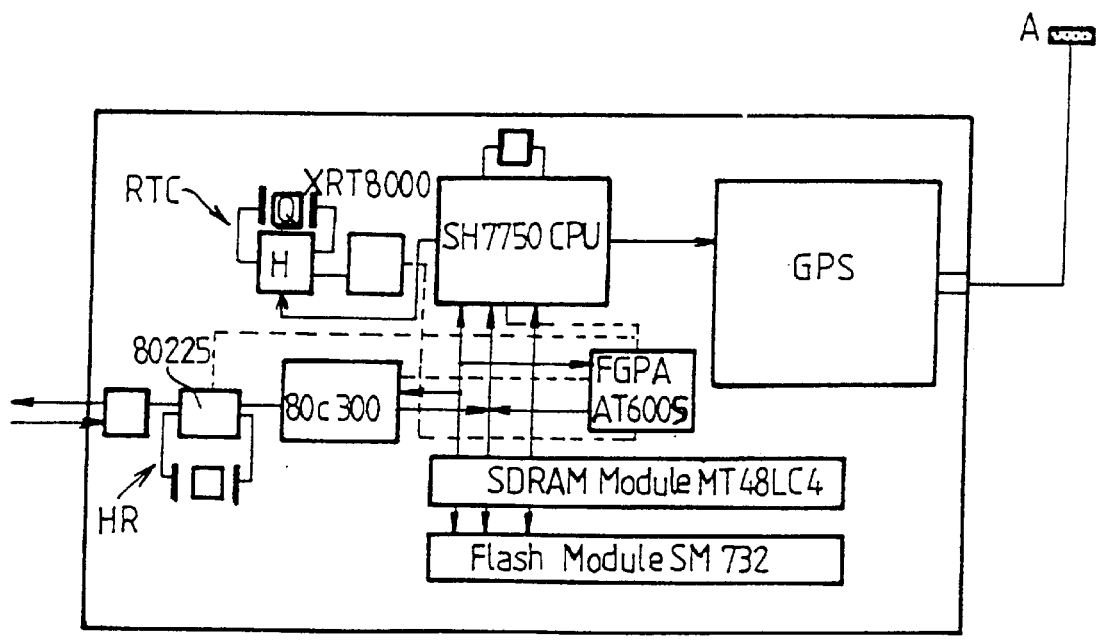
FIG. 6 shows a preferred embodiment in which the invention is implemented in the form of a module.

As shown in FIG. 6, the apparatus of the invention can be considered as comprising three portions:

the high performance central unit CPU such as an SH7750 component from Hitachi which has four DMA channels, dynamic memory SDRAM, flash memory, a real time clock RTC such as a DLS 1688 chip from Dallas associated with a temperature controlled crystal oscillator DS operating at 32 KHz or an RTC module which is integrated in the SH7750 processor. It also has a programmable flash memory module EPROM, e.g. an SM732 from Smart Module Technologies which contains the instructions of the sequencer. An SDRAM module referenced MT48LC4 from Micron contains the send and receive buffer registers referenced LQ, TQ, and RQ.

The network controller can be an LSC Logic Ethernet 80c300 10/100 Mbps controller with its associated 80–225 interface circuit or indeed it can be a WAN controller referenced SC26C552 from Philips.

The GPS receiver can be an Oncore TU Plus module from Motorola coupled to an antenna A.

The FIG. 6 module thus serves as a network interface for performing the functions of the invention, and possibly also for sending and receiving frames that are not time-stamped.

It will be understood that the FIG. 6 circuit which constitutes a module added to an existing computer such as a PC could be simplified by omitting the register LQ which would mean that the module is suitable for sending time-stamped frames only, thereby avoiding any need to manage priorities. However on reception, the module retains the function of sorting between time-stamped frames and other frames. It will be observed that in the context of the present invention, it is not necessary for the real time clock RTC to be very accurate. For example, high accuracy is not necessary when measuring a go-and-return transmission time since the same real time clock RTC marks each frame on departure and on arrival. Secondly, the desired accuracy can be obtained by synchronizing the real time clock RTC of one piece of equipment with the real time clock RTC of a remote piece of equipment, rather than seeking to obtain high intrinsic accuracy.

Furthermore, the device described is intended to provide the simplest possible adaptation to existing architectures in which there already exists a clock for the microprocessor CPU, and a network clock HR. In general, it is not necessary to have a plurality of clocks. In particular, it is possible for a single clock to combine the real time clock RTC and the network clock HR.

What is claimed is:

1. A method of using computer equipment to send a time-stamped frame, the method performing the steps of:

generating at a given instant $T_S$ a frame whose time stamp $T_O$ is equal to $T_S+\delta$, where $\delta$ is a time interval required by the computer equipment between generating a time-stamped frame and sending the last bit thereof;

sending said time-stamped frame as generated at the instant $T_S$ when an absolute time clock of the computer equipment reaches a value equal to $T_S+\delta-\sigma$ where $\sigma$ is the duration required for sending the bits of said frame, such that the last bit of the frame is sent at instant $T_S+\delta$.

2. A method according to claim 1, wherein the absolute time clock is clocked at a frequency equal to a frequency at which frame bits are sent by the computer equipment, or to a multiple or a submultiple thereof.

3. A method according to claim 1, wherein the given instant $T_S$ is generated by a reference counter based on an oscillator which is updated by a time reference.

4. A method according to claim 3, wherein the oscillator is of the temperature-compensated crystal oscillator type.

5. A method according to claim 3, wherein said time reference is generated by a receiver for receiving a universal time reference, in particular a GPS receiver.

6. A method according to claim 3, wherein the absolute time clock presents a first counter constituted by said reference counter and a second counter clocked by a frame send clock whose frequency is equal to the frequency at which frame bits are sent by the computer equipment, or indeed a clock whose frequency is equal to a multiple or a submultiple of the frequency of the frame send clock, and which is reset to zero by said first counter.

7. A method according to claim 1, storing said time-stamped frames in a first register and storing other frames in a second register, and sending a time-stamped frame on a priority basis from the first register at least whenever the computer equipment is not capable of sending an entire frame contained in the second register before instant $T_S+\sigma-\delta$.

8. A method according to claim 7, performing the steps of:

a) analyzing the content of the first and second registers by first and second respective frame identification pointers;

b) if at least one frame is contained in the second register, calculating the time it will take to send and calculating an ideal sending time $T_E$ which is the sum of the absolute time and the time taken to send said frame;

c) if the ideal time $T_E$ is less than $T_S+\sigma-\delta$, triggering sending of said frame contained in the second register;

d) otherwise, causing the second pointer to wait;

e) where appropriate, repeating steps b) to d) until the second pointer is caused to wait;

f) if the second pointer is caused to wait or if the test performed in a) indicates that the second register does not contain a frame, sending said time-stamped frame contained in the first register; and g) sending any frames contained in the second register and returning to a).

* * * * *